United States Patent Office 3,061,590
Patented Oct. 30, 1962

3,061,590
FLUORINATED POLYMERS
David C. Remy, Madison, Wis., assignor to E. I. du Pont de Nemours and Company, Wilmington, Del., a corporation of Delaware
No Drawing. Filed Jan. 31, 1961, Ser. No. 85,997
9 Claims. (Cl. 260—72)

This invention relates to novel fluorinated polymers and more particularly to thermally stable fluorinated polymers containing amidrazone and/or 1,3,4-triazole groups in the polymeric chain.

It is an object of this invention to provide novel thermally stable fluorinated polymers. A further object is to provide novel fluorinated polymers containing amidrazone and/or 1,3,4-triazole groups in the polymeric chain. A still further object is to provide a process for the preparation of these polymers.

These and other objects of this invention are accomplished by the polymers which contain a plurality of units selected from the group consisting of

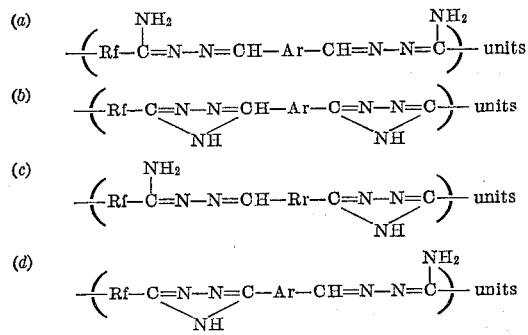

and
(e) mixtures of the above units, wherein Rf is a bivalent perfluoroalkylene radical having at least 3 carbon atoms and Ar is an aromatic hydrocarbon radical of from 6 to 18 carbon atoms which radical may be optionally substituted by alkyl radicals, alkoxy radicals or halogen atoms, with the residual valences of said aromatic hydrocarbon radical being on different carbon atoms; the above-described units being joined in head-to-tail fashion. For purposes of the present invention, it is preferred that the perfluoroalkyl radical, Rf, contain from about 3 to 14 carbon atoms and that the alkyl and alkoxy substituents on the Ar radical be lower alkyl and lower alkoxy. The halogen substituents on the Ar radical include chlorine, bromine, fluorine and iodine.

The term "perfluoroalkylene radical" as used throughout the specification and claims, refers to an alkylene radical wherein all the hydrogen atoms have been replaced by fluorine atoms. A perfluoroalkylene radical correspondingly contains only carbon and fluorine atoms. The carbon atoms therein are joined by carbon-to-carbon single bonds and each fluorine atom therein is joined only to a carbon atom.

The fluorinated polymers of this invention include those compounds which contain amidrazone and/or 1,3,4-triazole groups. Thus, this invention includes polymers which contain units of the following types:

+(Rf—X—Ar—X)+
+(Rf—Y—Ar—Y)+
+(Rf—X—Ar—X—Rf—Y—Ar—Y)+
+(Rf—X—Ar—Y)+
+(Rf—Y—Ar—X)+
+(Rf—Y—Ar—X—Rf—X—Ar—X)+
+(Rf—X—Ar—Y—Rf—X—Ar—X)+
+(Rf—X—Ar—X—Rf—Y—Ar—X)+
+(Rf—X—Ar—X—Rf—X—Ar—Y)+

+(Rf—X—Ar—Y—Rf—Y—Ar—Y)+
+(Rf—Y—Ar—X—Rf—Y—Ar—Y)+
+(Rf—Y—Ar—Y—Rf—X—Ar—Y)+ and
+(Rf—Y—Ar—Y—Rf—Y—Ar—X)+
wherein Rf and Ar are as defined above, X is an amidrazone group $$-\underset{NH_2}{\underset{|}{C}}=N-N=CH-$$

with the terminal amino bearing carbon atom of such group being attached to the perfluoroalkylene radical and Y is a 1,3,4-triazole group

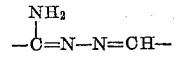

Representative examples of specific polymers within the scope of the present invention include polymers whose chains contain

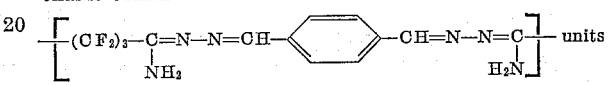

polymers whose chains contain

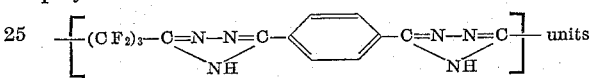

polymers whose chains contain

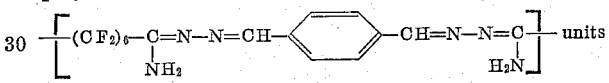

and polymers whose chains contain

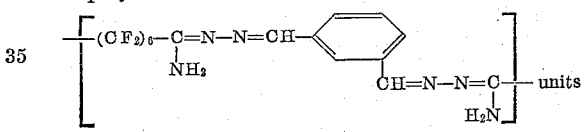

Polymers having N-arylmethylene perfluoroacylamidrazone units may be prepared by condensing an aromatic dialdehyde such as isophthaldehyde (or terephthaldehyde or mixtures thereof) with an equimolar amount of a perfluoroacyldiamidrazone at atmospheric pressure in refluxing ethanol and removing the water by azeotropic distillation. This reaction may be illustrated as follows:

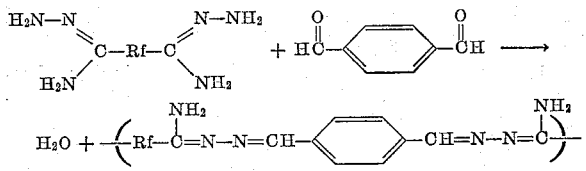

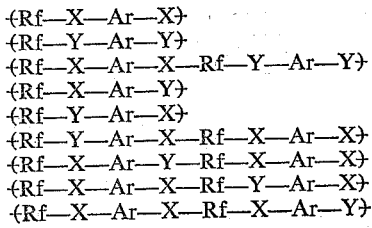

The progress of the reaction can be followed by measuring the amount of water obtained. After the reaction mixture has been allowed to cool, the insoluble polymer product is collected by conventional filtration procedures. Alternatively, the reaction can be carried out at 20 to 30° C. by shaking the dialdehyde and the diamidrazone in a closed glass reaction vessel containing water, one or more inert organic solvents, and a small amount of polyvinyl alcohol. The insoluble polymer product is collected by conventional filtration procedures.

Representative examples of the perfluoroacyldiamidrazones which can be used include: hexafluoroglutarodiamidrazone; octafluoroadipodiamidrazone; dodecafluorosuberodiamidrazone; hexadecafluorosebacodiamidrazone; and perfluoro-1,14-tetradecanediamidrazone.

Representative examples of the aromatic dialdehydes which can be used are: terephthaldehyde; 2,5-dichloroterephthaldehyde; 2,3,5,6 - tetrachloroterephthaldehyde; 2,3,5-trichloroterephthaldehyde; 2,5-dibromoterephthaldehyde; 2,5-dimethylterephthaldehyde; 2,3,5,6-tetramethylterephthaldehyde; 2,5-dimethoxyterephthaldehyde; 2,5-diethoxyterephthaldehyde; isophthaldehyde; 4-chloroisophthaldehyde; 2,4-dichloroisophthaldehyde; 2,4,6-trichloroisophthaldehyde; 2,3,4,6-tetrachloroisophthaldehyde; 4-methoxyisophthaldehyde; 5-methylisophthaldehyde; 4,5-dimethylisophthaldehyde; 4,6-dimethoxyisophthaldehyde; 2,3,4,6-tetramethoxyisophthaldehyde; 4,4'-diphenyldicarboxaldehyde; and 4,4'-diphenyletherdicarboxaldehyde.

Polymers containing 1,3,4-triazole groups are formed by oxidatively ring-closing polymers which contain amidrazone groups. A preferred process comprises treating a suspension of polymers which contain these groups at atmospheric pressure in refluxing glacial acetic acid with a molar excess (e.g. 5 to 30%) of iodine (based on one mole $I_2$ per $NH_2$ group), thereafter adding a saturated aqueous solution of sodium bisulfite (to destroy the excess iodine) and collecting the polymer product which precipitates.

Polymers wherein all of the amidrazone groups have been converted to 1,3,4-triazole groups may be illustrated by the following structure

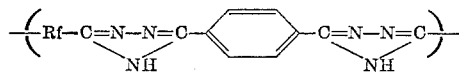

wherein Rf is as defined above.

The polymers within the scope of the present invention which contain both amidrazone groups and 1,3,4-triazole groups are prepared by treating a suspension of polymers which contain amidrazone groups with iodine as described above except that the reaction is not carried to completion (all of the amidrazone groups are not converted to triazoles) or less than a mole of iodine is supplied for every $NH_2$ group present in the polymer. The degree of completeness of the reaction or the amount of iodine supplied will determine how many of the amidrazone groups are converted to 1,3,4-triazole groups.

The perfluoroacyldiamidrazones themselves are made by adding the corresponding dinitriles in the conventional manner of hydrazine hydrate which is cooled by Dry Ice and serves as the solvent. In order to avoid polymer formation, at least 2 moles of hydrazine hydrate are required for every mole of dinitrile. Generally, a much greater proportion is used. In a representative procedure, the ratio is about 6:1. The temperature is allowed to rise to at least 20 to 30° C. afterward. The precipitated product is collected by filtration. If desired, water can be added and the mixture extracted with a water-immiscible solvent; evaporation of the solvent from the extract gives residual diamidrazone.

The novel polymers of the present invention are thermally stable and are highly useful for increasing the viscosity of fluids at high temperatures. The fusible isophthaldehyde based polymers may, when molten, be pumped through jacketed reactors, condensers, heat exchangers, and pipes made of steel, stainless steel, glass, and other conventional materials for confining heat transfer media. The infusible terephthaldehyde based polymers may be mixed with the fusible polymers to increase their viscosity; empirical testing can be used to determine the optimum amount to be added for a particular application. The polymers of this invention can be added to the fusible products described in my copending applications Serial No. 85,995 and Serial No. 85,996, filed of even date herewith, to increase their viscosity in a similar fashion. Thus the polymers of this invention can be used in equipment for molding plastic and rubber goods, processing paints, varnishes, and food products, fractionating petroleum, heating chemical process equipment, heating rotating drums and coating coils, and evaporating high-boiling solvents.

The following examples will better illustrate the nature of the present invention; however, the invention is not intended to be limited to these examples. Parts are by weight unless otherwise indicated.

EXAMPLE 1

(A) *Preparation of Diethyl Hexafluoroglutarate*

Hexafluoroglutaryl chloride (135.13 grams, 0.489 mole) was added dropwise to cold absolute ethanol (250 milliliters) over a 3-hour period. The mixture was refluxed for one hour and then cooled while stirred. Water (500 milliliters) was added to the mixture in a separatory funnel. The lower phase (the ester) was drawn off and subsequently washed, in turn, with dilute aqueous sodium bicarbonate solution and water. After it had been dried over anhydrous magnesium sulfate, it was distilled at 70 to 80° C. (2 to 4 mm. Hg). Diethyl hexafluoroglutarate (114.07 grams) was collected as a water white oil, $n_D^{25} = 1.3579$.

(B) *Preparation of Hexafluoroglutarodiamide*

Diethyl hexafluoroglutarate (224.6 grams) made by the procedure above was dissolved in 1200 milliliters of dry ether contained in a 4-neck 2-liter flask equipped with a stirrer, thermometer, condenser, gas inlet tube and cooled to 0 to 10° C. in an acetone-ice bath. Ammonia was bubbled in slowly for 4 hours. The mixture was allowed to warm to room temperature overnight while being stirred. After the mixture had been stirred thereafter for a day, the precipitated diamide was collected by filtration and air dried. In all 179.7 grams (99.5% yield) of hexafluoroglutarodiamide was obtained melting at 214 to 214.5° C.

(C) *Dehydration of Hexafluoroglutarodiamide to Hexafluoroglutarodinitrile*

Hexafluoroglutarodiamide (47.6 grams, 0.2 mole) prepared by the above procedure was charged into round-bottom flask equipped with a thermometer and a take-off condenser attached to two traps in series immersed in Dry Ice. After nitrobenzene (500 milliliters), barium oxide (30 grams), and phosphorous pentoxide (115 grams, 0.81 mole) had been introduced, heat was applied to the agitated mixture obtained. At 130° C. a colorless distillate began collecting (head temperature 23–38° C.). The pot temperature was raised to 190° C. and held at 190 to 200° C. for 2 hours. After that time no more distillate appeared. The distillate collected (21.28 grams) was redistilled to give pure hexafluoroglutarodinitrile (19.29 grams, 48% yield based on the diamide) boiling about 38.5° C. at atmospheric pressure.

(D) *Preparation of Hexafluoroglutarodiamidrazone*

The reaction vessel was a round-bottom flask equipped with a stirrer, a Dry Ice condenser having a drying tube attached to its outlet, and a side-arm attached to a bulb containing hexafluoroglutarodinitrile (19.29 grams, 0.0955 mole). After the flask had been flushed with nitrogen, hydrazine hydrate (30 milliliters, 0.6 mole) was introduced and cooled by a Dry Ice bath. Then the dinitrile was distilled over a 30-minute period into the slowly stirred hydrazine hydrate. The yellow reaction mixture was stirred for 30 minutes afterward while cooled in Dry Ice and for 1 hour at room temperature. Then ice water (150 milliliters) was added. The precipitated hexafluoroglutarodiamidrazone (4.33 grams, 17% yield) was collected by filtration and recrystallized from ethyl acetate as fine fluffy needles, M.P. 132–133° C.

*Analysis.*—Calcd. for $C_5H_8F_6N_6$: C, 22.56; H, 3.03; F, 42.83; N, 31.58. Found: C, 22.7, 23.0; H, 3.2, 3.2; F, 42.3, 42.2; N, 31.7, 31.8.

(E) *Reaction of Hexafluoroglutarodiamidrazone and Terephthalaldehyde*

Into a round-bottom flask equipped with a thermometer and a Dean and Stark water separator were placed 1.6868 grams of hexafluoroglutarodiamidrazone and 25 milliliters of absolute ethanol. While the solution was being agitated by a magnetic stirrer, 0.8500 gram of terephthalaldehyde and 25 milliliters of ethanol were added. No heat evolution was noticed on mixing the reagents, but after 30 minutes, the mixture had become homogeneous and had acquired a bright yellow color. After stirring had continued another 15 minutes, a yellow polymer formed. The mixture was then heated under reflux for 168 hours. During this reflux period, five 20-milliliter portions of ethanol were removed from the water separator; each time an equivalent amount of fresh absolute ethanol was added to the reaction pot. The mixture was cooled, filtered, and the insoluble yellow polymer was dried. An infrared spectrum ("Nujol" mull) showed bands at 2.80, 2.89, 6.09, and 6.21 microns. Inherent viscosity (0.1 solution in dimethylformamide at 30° C.): 0.34, 0.36. This polymer may be represented as follows:

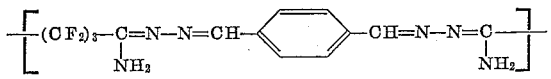

*Analysis.*—Calcd. for $(C_{13}H_{10}F_6N_6)_x$: C, 42.86; H, 2.77; F, 31.30; N, 23.07. Found: C, 43.4, 43.6; H, 2.7, 3.0; F, 30.1, 30.2; N, 23.1, 22.9.

EXAMPLE 2

A small crystal of iodine was added to a suspension of 1.04 grams of the polymer prepared in Example 1(E) in 50 milliliters of glacial acetic acid under atmospheric pressure at about 25° C. The mixture was agitated by a magnetic stirrer for 16 hours. Then 1.5 more grams of iodine were added (about a 3% molar excess of $I_2$). Finally, the mixture was heated under gentle reflux for four hours.

Saturated aqueous sodium bisulfite was added to the mixture at about 25° C. until the excess iodine was consumed. The yellow precipitate obtained was removed by filtration, washed with water, and dried under vacuum to give 0.83 gram of a yellow polymer whose infrared spectrum showed bands at 6.10 and 6.31 microns. Inherent viscosity (0.094% solution in dimethylformamide at 30° C.): 0.03; 0.04. This polymer may be represented as follows:

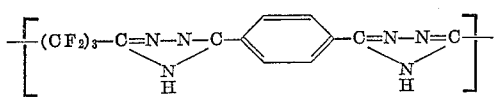

EXAMPLE 3

*Reaction of Dodecafluorosuberodiamidrazone and Terephthalaldehyde*

Into a 4-ounce glass bottle were placed 3.1074 grams (0.007466 mole) of dodecafluorosuberodiamidrazone, 1.0015 grams (0.007466 mole) of terephthalaldehyde, 0.25 gram of polyvinyl alcohol, 50 milliliters of boiled, deaerated water, and 50 milliliters of ethyl acetate. The polyvinyl alcohol has a density of 1.21–1.31 at 20° C.; 99–100% hydrolysis; 4% water solution at 20° C. has a viscosity of 55–65 cp. After the bottle had been tightly capped, it was shaken vigorously for 96 hours. The bottle was opened and the mixture therein filtered on a suction funnel. The filter cake was washed well with water. After drying, there was obtained 3.86 grams of polymer. Inherent viscosity (0.1% solution in dimethylsulfoxide at 30° C.): 0.44, 0.43. Infrared spectrum showed bands at 2.84 (weak), 2.94 (weak), 6.11 (strong), and 6.23 (weak) microns. This polymer may be represented as follows:

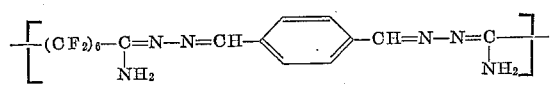

*Analysis.*—Calcd. for $(C_{16}H_{10}F_{12}N_6)_x$: C, 37.37; H, 1.96; N, 16.34. Found: C, 37.6, 37.9; H, 2.3, 2.6; N, 15.5, 15.3.

EXAMPLE 4

*Reaction of Dodecafluorosuberodiamidrazone and Terephthalaldehyde*

Into a 4-ounce glass bottle were placed 3.3006 grams (0.007931 mole) of dodecafluorosuberodiamidrazone, 1.0637 grams (0.007931 mole) of terephthalaldehyde, 0.25 gram of polyvinyl alcohol, 50 milliliters of boiled, deaerated water, 30 milliliters of carbon tetrachloride, and 20 milliliters of dimethylformamide. The polyvinyl alcohol has a density of 1.21–1.31 at 20° C.; 99–100% hydrolysis; 4% water solution at 20° C. has a viscosity of 55–65 cp. After the bottle had been tightly capped, it was shaken vigorously for 96 hours. It was opened and the voluminous yellow precipitate that had formed was removed by suction filtration and washed well with water. After drying, there was obtained 4.75 grams of the polymer. Inherent viscosity (0.1% solution in dimethylsulfoxide at 30° C.): 0.35, 0.34.

EXAMPLE 5

*Reaction of Dodecafluorosuberodiamidrazone and Isophthalaldehyde*

Into a 4-ounce glass bottle were placed 3.1284 grams (0.007517 mole) of dodecafluorosuberodiamidrazone, 1.0082 grams (0.007517 mole) of isophthalaldehyde, 0.25 gram of polyvinyl alcohol, 50 milliliters of boiled, deaerated water, 30 milliliters of carbon tetrachloride, and 20 milliliters of dimethylformamide. The polyvinyl alcohol has a density of 1.21–1.31 at 20° C.; 99–100% hydrolysis; 4% water solution at 20° C. has a viscosity of 55–65 cp. After the bottle had been tightly capped it was shaken vigorously for 96 hours. It was opened and the voluminous white precipitate that had formed was removed by suction filtration and washed well with water. After drying, there was obtained 3.93 grams of the polymer. Inherent viscosity (0.1% solution in dimethylsulfoxide at 30° C.): 0.17, 0.20. The polymer may be represented as follows:

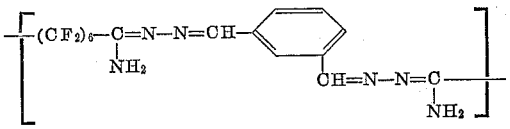

*Analysis.*—Calcd. for $(C_{16}H_{10}F_{12}N_6)_x$: C, 37.37; H, 1.96; N, 16.34. Found: C, 38.2, 38.4; H, 2.8, 3.0; N, 17.0, 17.1.

As many widely different embodiments of this invention may be made without departing from the spirit and scope thereof, it is to be understood that this invention is not limited to the specific embodiments thereof except as defined in the appended claims.

What is claimed is:

1. Fluorinated polymers containing a plurality of units selected from the group consisting of (a) 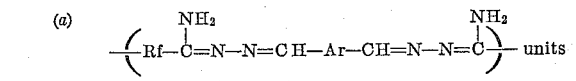

(b) 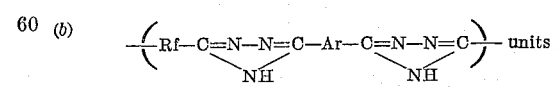

(c) 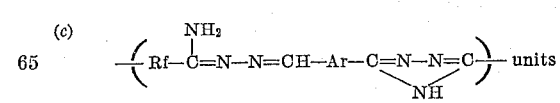

(d) 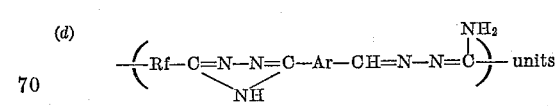

and (e) mixtures of the above units, wherein Rf is a bivalent perfluoroalkylene radical having at least 3 carbon atoms and Ar is a bivalent aromatic hydrocarbon radical selected from the group consisting of a 6 to 18 carbon atom aromatic hydrocarbon radical, an alkyl substituted 6 to 18 carbon atom aromatic hydrocarbon radical, an alkoxy substituted 6 to 18 carbon atom aromatic hydrocarbon radical and a halogen substituted 6 to 18 carbon atom aromatic hydrocarbon radical, with the residual valences of said aromatic hydrocarbon radical being on different carbon atoms; the above-described units being joined in head-to-tail fashion.

2. Fluorinated polymers according to claim 1 wherein Rf is a bivalent perfluoroalkylene radical of from 3 to 14 carbon atoms.

3. A fluorinated polymer consisting essentially of units having the following structure

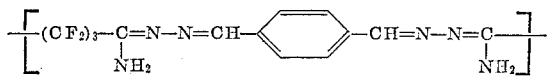

4. A fluorinated polymer consisting essentially of units having the following structure

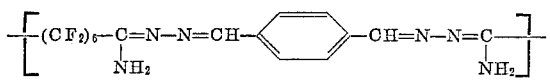

5. A fluorinated polymer consisting essentially of units having the following structure

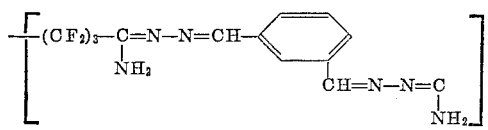

6. A process for preparing a fluorinated polymer containing a plurality of units of the following structure

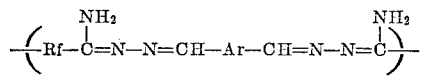

wherein Rf is a bivalent perfluoroalkylene radical having at least 3 carbon atoms and Ar is a bivalent aromatic hydrocarbon radical selected from the group consisting of a 6 to 18 carbon atom aromatic hydrocarbon radical, an alkyl substituted 6 to 18 carbon atom aromatic hydrocarbon radical, an alkoxy substituted 6 to 18 carbon atom aromatic hydrocarbon radical and a halogen substituted 6 to 18 carbon atom aromatic hydrocarbon radical, which comprises reacting a perfluoroacyldiamidrazone with an equimolar amount of an aromatic dialdehyde.

7. A process according to claim 6 wherein the perfluoroacyldiamidrazone is hexafluoroglutarodiamidrazone and the aromatic dialdehyde is terephthalaldehyde.

8. A process according to claim 6 wherein the perfluoroacyldiamidrazone is dodecafluorosuberodiamidrazone and the aromatic dialdehyde is terephthalaldehyde.

9. A process for preparing a fluorinated polymer containing a plurality of units having the structure

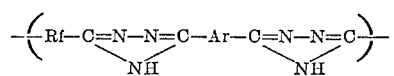

which comprises reacting a polymer which contains a plurality of units having the following structure

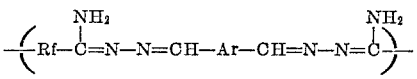

with a molar excess of iodine, wherein Rf is a bivalent perfluoroalkylene radical having at least 3 carbon atoms and Ar is a bivalent aromatic hydrocarbon radical selected from the group consisting of a 6 to 18 carbon atom aromatic hydrocarbon radical, an alkyl substituted 6 to 18 carbon atom aromatic hydrocarbon radical, an alkoxy substituted 6 to 18 carbon atom aromatic hydrocarbon radical and a halogen substituted 6 to 18 carbon atom aromatic hydrocarbon radical.

No references cited.